United States Patent [19]
Gödel et al.

[11] Patent Number: 5,791,697
[45] Date of Patent: Aug. 11, 1998

[54] DEVICE FOR THE MOVABLE CONNECTION OF PIPE ENDS

[75] Inventors: Frank-Uwe Gödel, Stutensee; Wieland Holzhausen, Auerbach; Andreas Schill, Stutensee, all of Germany

[73] Assignee: IWK Regler and Kompensatoren GmbH, Stutensee, Germany

[21] Appl. No.: 580,288

[22] Filed: Dec. 28, 1995

[30] Foreign Application Priority Data

Jan. 6, 1995 [DE] Germany ............... 195 00 264.4

[51] Int. Cl.⁶ ............................................. F16L 77/11
[52] U.S. Cl. ............... 285/300; 285/226; 285/114; 285/301; 92/41
[58] Field of Search ............... 285/299, 300, 285/301, 226, 227, 114, 45, 47; 42/40, 41, 42, 43

[56] References Cited

U.S. PATENT DOCUMENTS

| | | | |
|---|---|---|---|
| 3,084,957 | 4/1963 | Caldwell | 285/301 |
| 3,647,246 | 3/1972 | Burtis | 285/301 |
| 4,659,117 | 4/1987 | Holzhausen et al. | 285/301 |
| 5,299,837 | 4/1994 | Lagier | 285/299 |
| 5,403,044 | 4/1995 | Holl | 285/226 |
| 5,437,479 | 8/1995 | Hartling et al. | 285/300 |
| 5,482,330 | 1/1996 | Holzhausen | 285/299 |
| 5,511,828 | 4/1996 | Kurek et al. | 285/300 |

FOREIGN PATENT DOCUMENTS

| | | | |
|---|---|---|---|
| 968978 | 6/1975 | Canada | 285/114 |
| 0543715 | 5/1993 | European Pat. Off. | |
| 859383 | 12/1939 | France | 92/41 |
| 2644552 | 9/1990 | France | 285/114 |
| 2701753 | 8/1994 | France | 285/114 |
| 3321382 | 2/1984 | Germany | |
| 266835 | 4/1989 | Germany | 285/114 |
| 4401827 | 8/1994 | Germany | |
| 695015 | 8/1953 | United Kingdom | 285/301 |

*Primary Examiner*—Eric K. Nicholson
*Attorney, Agent, or Firm*—Antonelli, Terry, Stout, & Kraus, LLP

[57] ABSTRACT

The invention relates to a device for the movable connection of pipe ends, particularly of motor vehicle exhaust systems, with a flexible pipe element, such as a metal bellows, hose or the like, and with damped, spring elastic elements acting between the connection ends of the flexible pipe element. Such a device must have a simple construction, but must on the one hand compensate the relative movements acting between said connection ends and on the other ensure the necessary restoring forces for restoring the pipe element to its central position. In such a device, the invention provides for the elements to be held in expanding fastenings of supports parts, so that the linear spring characteristic of the elements is progressively modified by the expanding fastenings.

18 Claims, 12 Drawing Sheets

DEVICE FOR THE MOVABLE CONNECTION OF PIPE ENDS

FIELD OF THE INVENTION

The invention relates to a device for the movable connection of pipe ends, particularly in motor vehicle exhaust systems, with a flexible pipe element having connection ends, such as a metal bellows, hose, etc., with damped, spring elastic elements acting between the connection ends.

BACKGROUND OF THE INVENTION

Such devices are known from EP 543 715 Al, FR 2 701 753 Al and DE 44 01 827 Al. The devices function with metal cables, which act between support parts and are either placed in ring-like manner around the flexible pipe element or are arranged in the form of several elements between the support parts. They perform their spring function by deformation and their damping function by friction.

The problem of the invention is to provide a device of the aforementioned type, in which the necessary elastic restoring forces are still obtained in the case of a good decoupling action.

SUMMARY OF THE INVENTION

In the case of a device of the aforementioned type, according to the invention the problem is solved in that the elements are held in expanding fastenings of the support parts, so that the linear spring characteristic of the elements is progressively modified by the expanding fastenings. In a preferred embodiment, the elements at least in projection have a circular contour and the fastenings expand perpendicular to the circumferential extension of the elements and in particular the fastenings have expanding channels or grooves in which the elements are embedded.

The elements are located in the fastenings which, as stated, are optionally constructed as channels of the two support parts and optionally they can be completely enclosed, if they are not prevented in some other way from passing out of the fastenings or channels. As a result of the expansion of the fastenings or chambers on the one hand there is a certain mobility of the elements perpendicular to their extension or circumferential direction, but this mobility is limited by the boundary walls of the fastenings. With increasing relative movement of the support parts with respect to one another, the elements are increasingly supported on the walls of the fastenings, but their freely movable portion is consequently reduced, so that there is a progressive spring force path or a progressively increasing force-path spring characteristic as the relative displacements increase between the two support parts or the connection ends of the flexible pipe part firmly connected thereto.

With this increasing self-closure between the elastic element and the walls of the fastenings of the support parts a similar effect is obtained to that occurring on compressing wire gauze cushions, as known from DE 33 21 382. The damping and spring characteristics can be matched to one another in an optimum manner by the solution according to the invention.

According to a preferred embodiment, the fastenings expand on all sides of the elements and in particular the fastenings expand towards front faces of the support parts.

According to a preferred embodiment, the elements have a circular construction. However, alternatively thereto, the elements can have a helical construction and the fastenings can expand in the direction of the circumference of the helically constructed elements. The expansion of the fastenings or chambers receiving the element consequently does not take place in the extension direction of the helically constructed element, so that the latter could bend about its axis in the unloaded state, but instead in the circumferential direction, so that when forces, in particular radially acting forces, occur the element could be deformed from its cylindrical contour to an oval or elliptical contour in section or in projection.

According to a preferred embodiment, the elements have a meander-like path. The elements are guided around the circumference of the support parts, preferably in the grooves forming the fastenings, which in turn expand, namely in the vicinity of the front faces of the support parts, so that here again there is the same limited, free mobility for the elements in the case of smaller relative movements of the two support parts, whereas with larger movements the elements engage on the walls of the fastenings or grooves and consequently their free mobility is limited and the aforementioned progression action occurs. The arrangement or orientation of the damped, spring elastic elements can take place in different ways. As circular elements they can adapt to the contour of the support parts, so that their axis of symmetry is substantially radial to the major axis of the device or the flexible pipe element. Instead, they can also be oriented in such a way that their axis of symmetry is parallel, tangential or inclined under a finite angle unequal to 90° to said major axis, i.e. with a radial and a parallel component to said major axis.

Whereas the damped, spring elastic element can fundamentally be constructed as a solid ring, such as a steel ring, in preferred embodiments the elements comprise interlaced metal wires or stranded individual wires.

BRIEF DESCRIPTION OF THE DRAWINGS

Further advantages and features of the invention can be gathered from the claims and following description of embodiments of the invention with reference to the attached drawings, which show:

DETAILED DESCRIPTION OF EMBODIMENTS

The object of the invention is to provide a device for the movable connection of pipe ends of exhaust systems in motor vehicles. The device 1 according to the invention, in FIG. 1, has at least one gas-tight pipe element 2, which in the represented embodiments is in the form of a metal bellows. The pipe element 2 has connection ends 3, 4, to each of which is connected a support structure, namely a support part 6, 7. The supports 6, 7 have fastenings 8, 9 for a damped, resiliently acting element 11. The damped, resilient element is shown as a ring in the specifically represented embodiments, so that it has a circular contour. However, it could also be in the form of a helical spring, as is diagrammatically represented as variant E in FIG. 14. In the case of an element 11 in the form of a helical spring, the representations of FIGS. I to 3 and 6 to 12 could be understood as a projection along the axis e–e' of the said spring.

Figure 12:
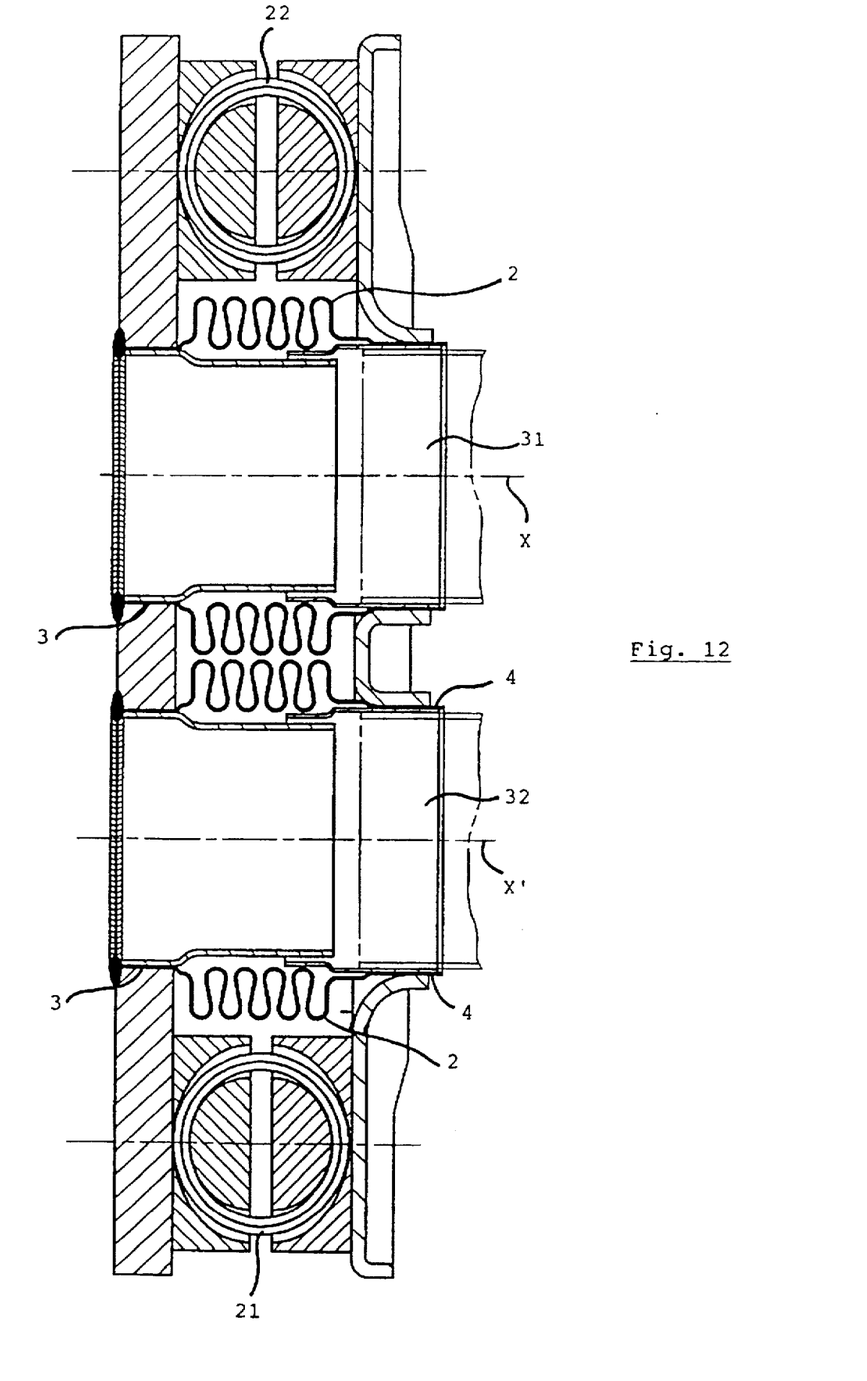
FIG. 12 A section through a dual flow device according to the invention with spring elements in the orientation of FIGS. 6 and 7.

An element corresponding to element 11 is provided on the side opposite to the element 11 diagonally relative to the axis X of the device 1, as can be gathered from the section of FIG. 12 for a dual flow device.

Therefor the element 11 has the characteristics of a real spring. It can be a solid spring ring (or in the case of a helical construction a helical spring). In a preferred embodiment the element is a wound flat spring strip or a wound, stranded or interlaced spring wire.

Figure 5:
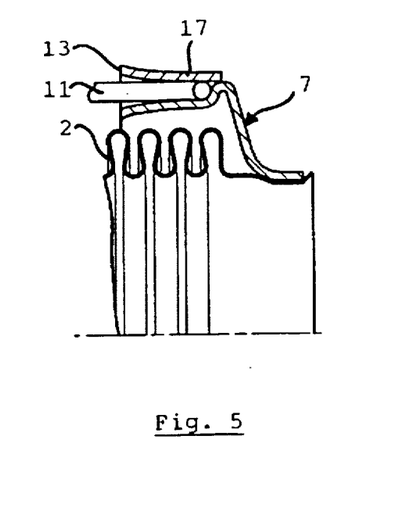
FIG. 5 A section corresponding to section V—V along the part curved section line V' of FIG. 1.

The fastenings 8, 9 have in each case part circular and almost semicircular grooves in the support parts 6, 7. The grooves or fastenings 8, 9 have in their areas close to the connection ends 3, 4 a cross-section adapted to that of the element 11 or a cross-section corresponding thereto, whilst continuously expanding to the facing, free front faces 12, 13 of the support parts 6, 7, both in the circumferential direction and in the radial direction with respect to the axis X. They expand on either side of the element 11 in its unloaded state, so that the walls 14, 16 are detached from the element 11. The grooves 8, 9 are covered by a cover 17, which is detached from the element 11 towards the front faces 12, 13, such as can in FIG. 5.

Figure 2:
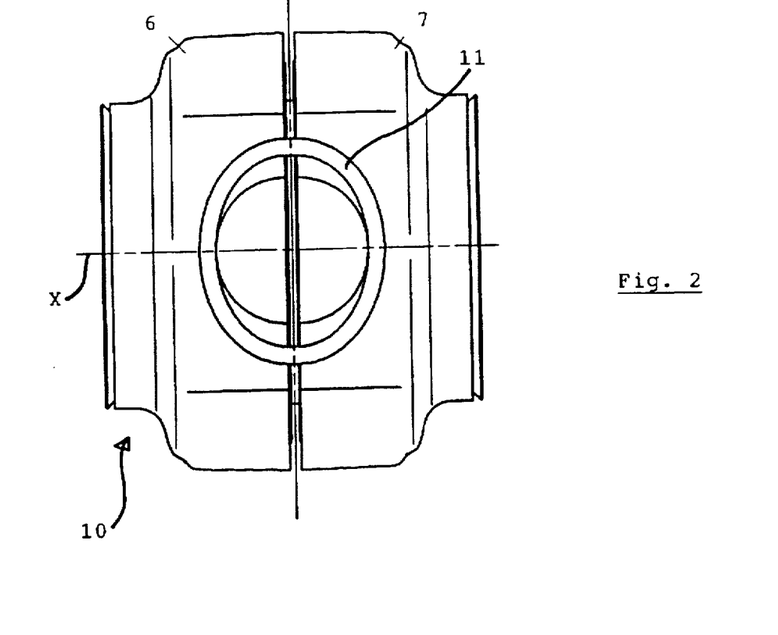
FIG. 2 The device of FIG. 1 with compressive forces acting on the connection ends, once again in side view.
Figure 3:
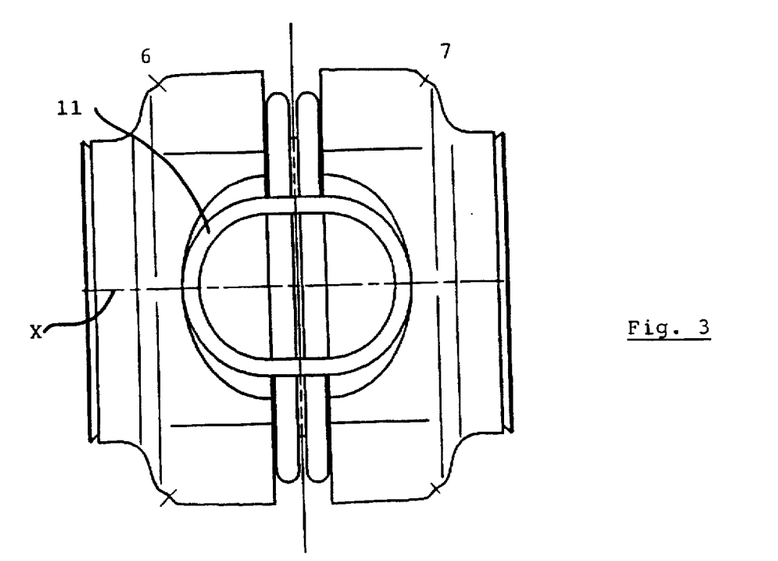
FIG. 3 A view corresponding to FIG. 2 with tensile forces acting on the connection ends.
Figure 4:
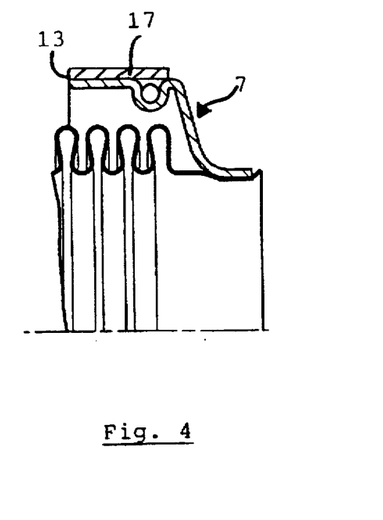
FIG. 4 A section along IV—IV of FIG. 1.

If the device 1 is now compressed, i.e. in particular axial compressive forces are exerted thereon, as shown in FIG. 2, then the element 11 assumes the elliptical shape shown, with the short axis of the ellipse running parallel to the major axis X of the device 1, whereas the large axis extends perpendicular thereto along the circumference of the support parts 6, 7. If the element 11 comes into engagement with the wall, then there is a strong progressive rise in the force-path characteristic for further compression of the device 1. The same is the case if, according to FIG. 3, tensile forces act on the twb ends of the device 1. As soon as the element 11 has assumed its oval shape shown therein, with the large axis parallel to the extension direction of the major axis X of the device 1, the element 11 is no longer subject to pure deformation from its circular shape and instead tensile forces are exerted thereon or on the individual wires forming it, so that there is once again a strong progressive force-path characteristic when further tensile forces are exerted.

Whereas in the embodiment of FIGS. 1 to 5 the element 11 adapts to the circumference of the support parts 6, 7, the further embodiments show other arrangements and orientations of a corresponding, circular element 11.

Fundamentally identical parts in these drawings are given the same reference numerals. In addition, it is possible to see gas distribution pipes 21, 22, which can also be present in the embodiment of FIGS. 1 to 5.

Figure 6:
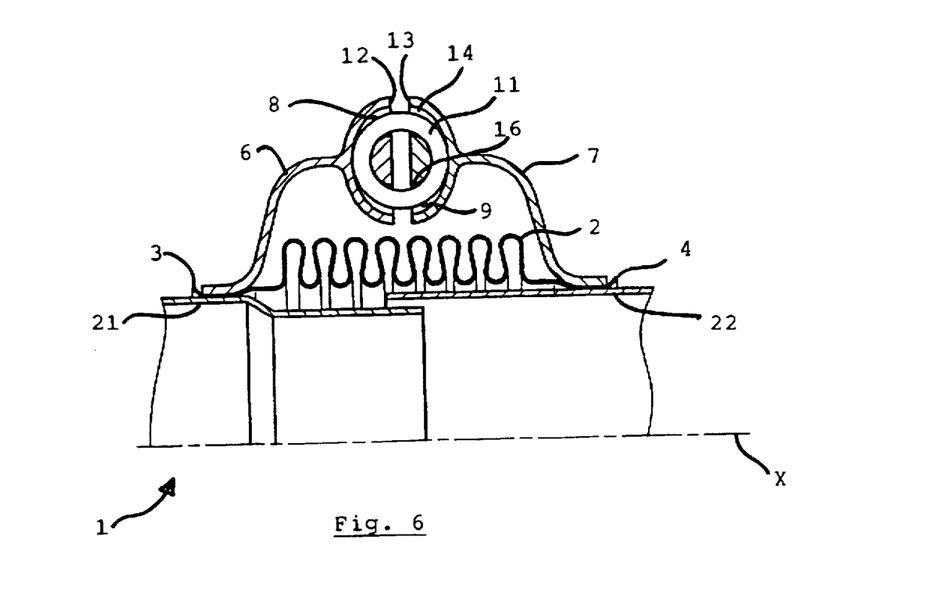
FIG. 6 A longitudinal section through another embodiment of the invention.
Figure 16:
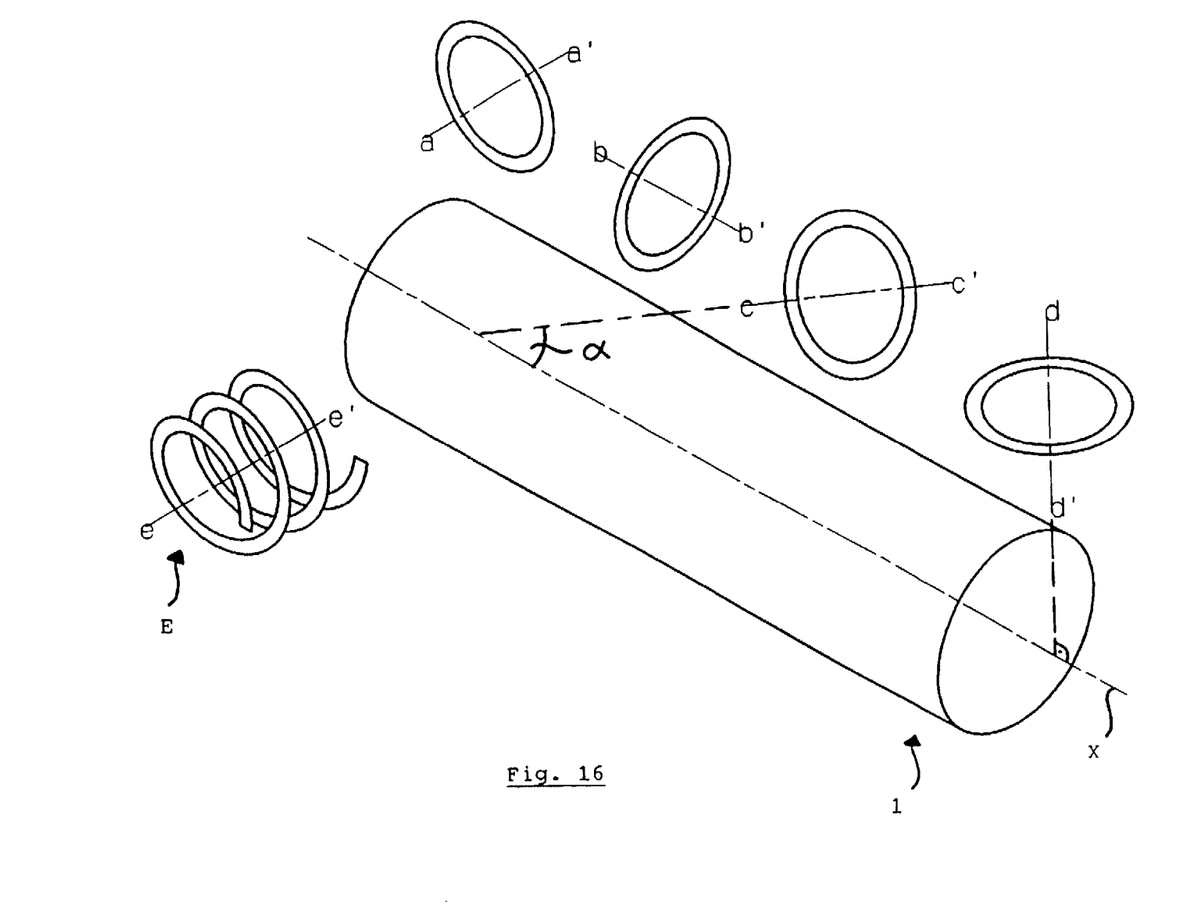
FIG. 16 A diagrammatic representation of the arrangement of the circular elements corresponding to the embodiments of FIGS. 1 to 11 and the representation of a spring element with a helical construction.

Whereas in the construction of FIGS. 1 to 5 the centre or symmetry axis d–d' is directed radially to the device 1 in accordance with FIG. 16, the construction of FIG. 6 has a symmetry axis a–a' of the element 11, which is tangential to the device 1 and which is represented diagrammatically by a cylinder in FIG. 16. Thus, the element 11 and the fastening are substantially radial to the major axis X, the division of the two support parts 6, 7, as in the construction of FIG. 1, being in a radial plane to the major axis X.

Figure 7:
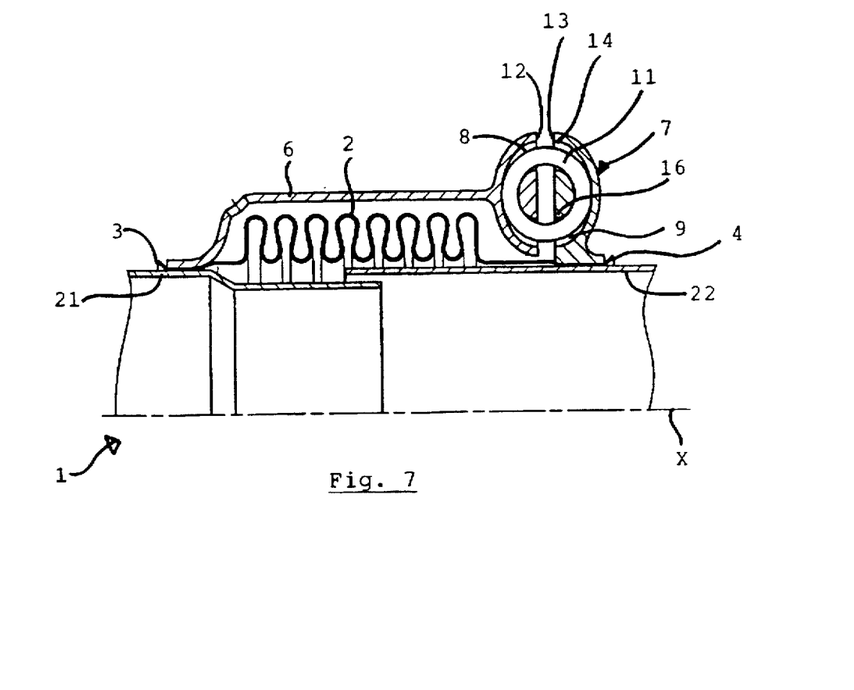
FIG. 7 A longitudinal section through a variant of FIG. 6.

The same is the case in the construction of FIG. 7, but here it is an asymmetrical construction, where the element 11 is no longer arranged radially over the flexible pipe part 2, but is instead the direction is displaced, towards the end 4 of the flexible element 2.

Figure 8:
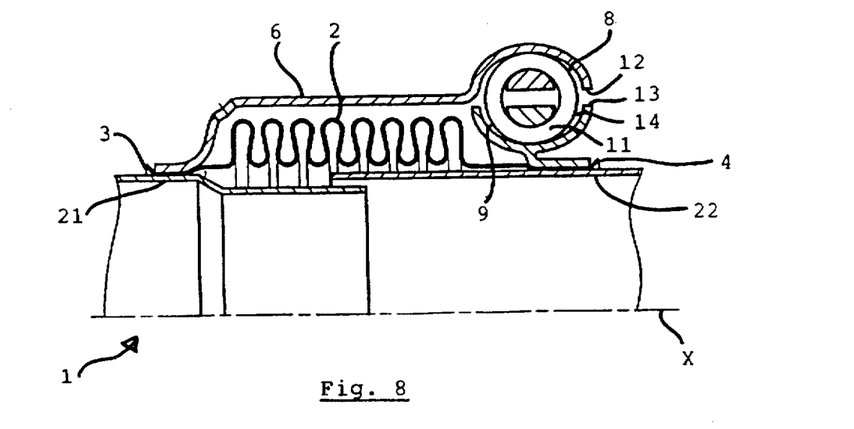
FIG. 8 A longitudinal section through another embodiment of the invention.

The same arrangement is used in the construction of FIG. 8, but here the division between the support parts 6, 7 is not in a radial plane, but instead in a tangential plane. The orientation of the element 11 corresponds to that of FIGS. 6 and 7, i.e. with a symmetry axis a–a' corresponding to FIG. 16. The device of FIG. 8 can also absorb axial tensile or compressive forces and then there is a shear-like deformation of the element 11. This construction is particularly suitable for absorbing radial displacement forces or angular forces, in which once again compressive or tensile forces act on the element 11 corresponding to those occurring with axial movements in the embodiment of FIGS. 1 to 5.

Figure 9:
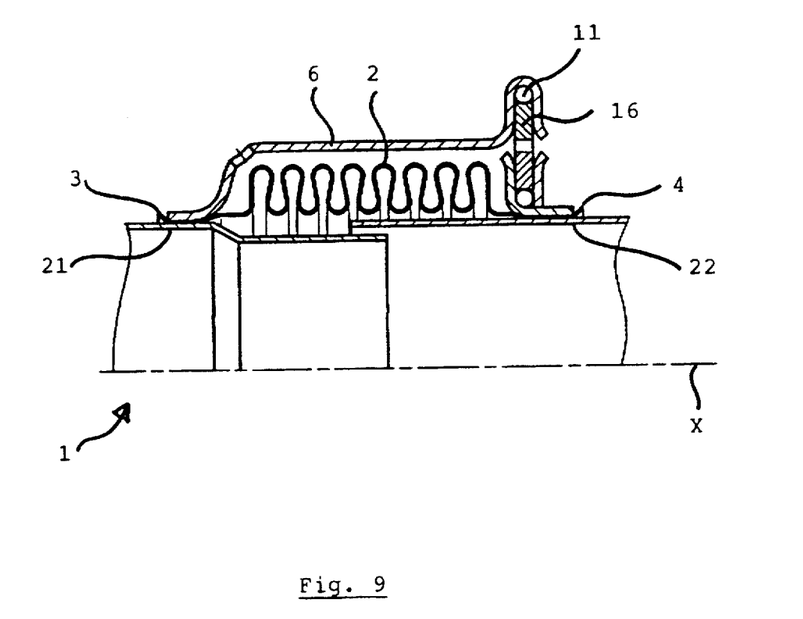
FIG. 9 A longitudinal section through a modified embodiment of the device according to the invention.

In the embodiment of FIG. 9 the subdivision of the support parts 6, 7 is in accordance with FIG. 8, i.e. in a tangential plane to the major axis X. The element 11 is once again positioned radially to the major axis X, i.e. is rotated by 90° about the radius compared with the construction of FIGS. 6 to 8. The orientation of the axis of symmetry of the element 11 corresponds to the axis b–b' in FIG. 16. Thus, th e axis of symmetry is parallel to the major axis X. Under the action of the axial forces there is a shear of the element 11 in a direction perpendicular to the plane of the element in th e unloaded state. With a radial displacement or angular forces, essentially compressive or tensile forces act in the plane of the element 11.

Figure 1:
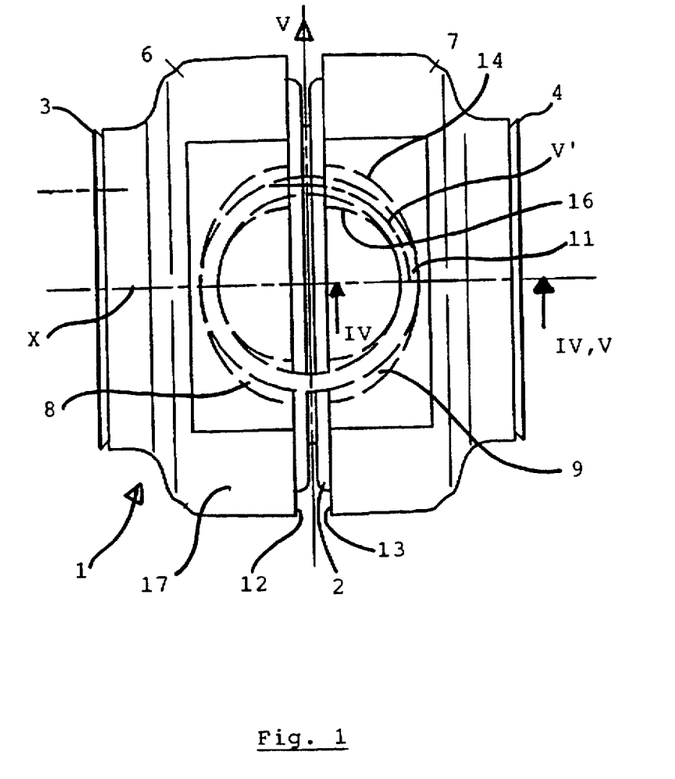
FIG. 1 A side view of a first embodiment of the invention in the unloaded state with functional elements shown in broken line form below a position securing means in the form of a cover plate.
Figure 10:
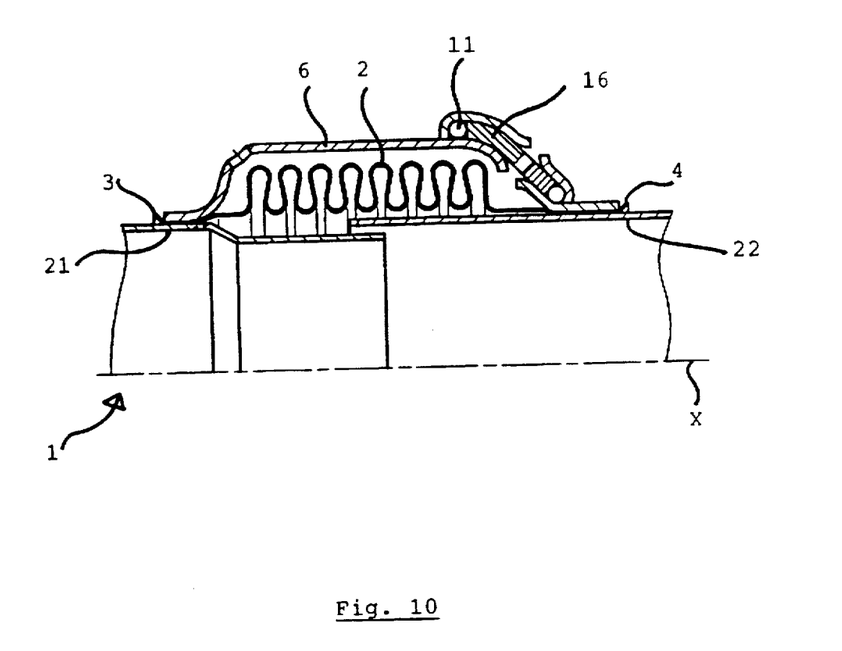
FIG. 10 A further embodiment of the device according to the invention.

In the construction of FIG. 10 the element 11 assumes an intermediate position between the orientation of FIGS. 1 t o 5 and FIG. 9. It is inclined under an angle unequal to 0 and unequal to 90° to the major axis X. Its symmetry axis c–c' in FIG. 16 intersects the major axis X of the device 1 under an angle α unequal to 0 and unequal to 90°, preferably under an angle of 30° to 60°, particularly 45°. In the unloaded state the element need not be completely planar and can instead adapt to the contour of the support parts, as can be seen in FIG. 10 through a slight bending of the element 11 and an adaptation to the end of the support part 6 close to the support part 7.

Figure 11:
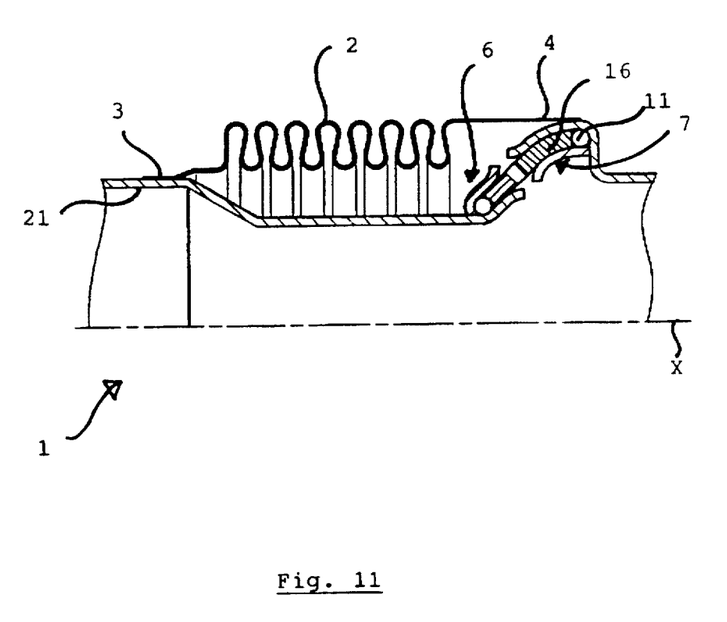
FIG. 11 A embodiment of the device according to the invention, where the spring element is located within the bellows contour.

The division of the support parts 6, 7 once again takes place in a plane which forms a finite angle unequal to 0 and unequal to 90° to the major axis X, i.e. is approximately under an angle of 45° thereto. FIG. 11 shows an arrangement similar to FIG. 10. However, in this case the support parts are not located outside the flexible pipe part 2 or the space bounded by it and which can be taken up by the fluid passed through said pipe, but is instead inside the same. Therefore the element 11 is located within the aforementioned space. The support part 6 is combined with or connected to the protective pipe 21. The damping characteristics of the element are essentially the same as for the element of FIG. 10.

FIG. 12 shows a dual flow solution with two pipes 31, 32. The elements 11 are radial to the major axes X and X', so that their arrangement essentially corresponds to that of FIG. 6.

Figure 13A:
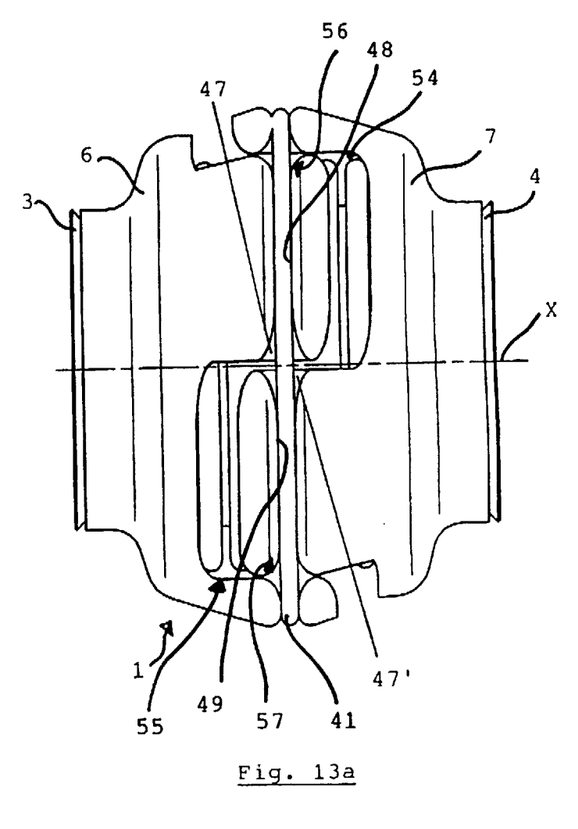
FIGS. 13a. A first embodiment with a coaxially arranged spring element 13b in the rest position and on exerting tensile forces.
Figure 13B:
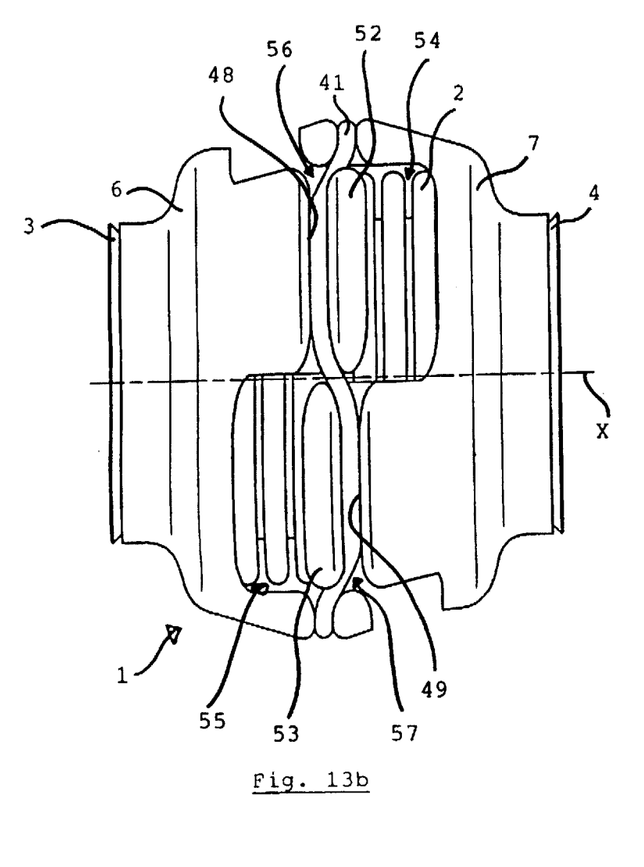
Figure 14:
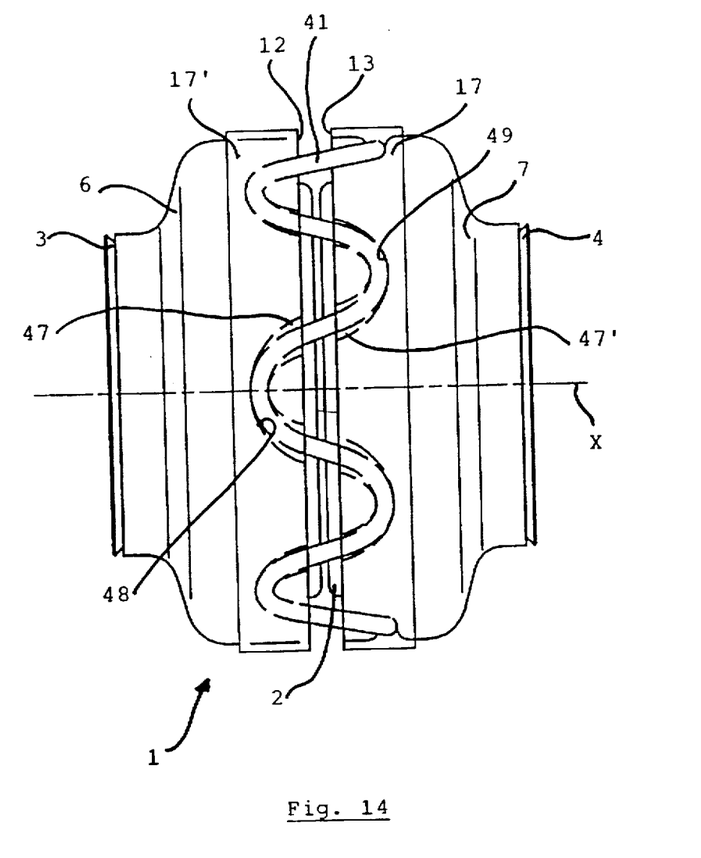
FIG. 14 Another embodiment with a coaxially arranged spring element guided in meander-like manner between the support parts.
Figure 15:
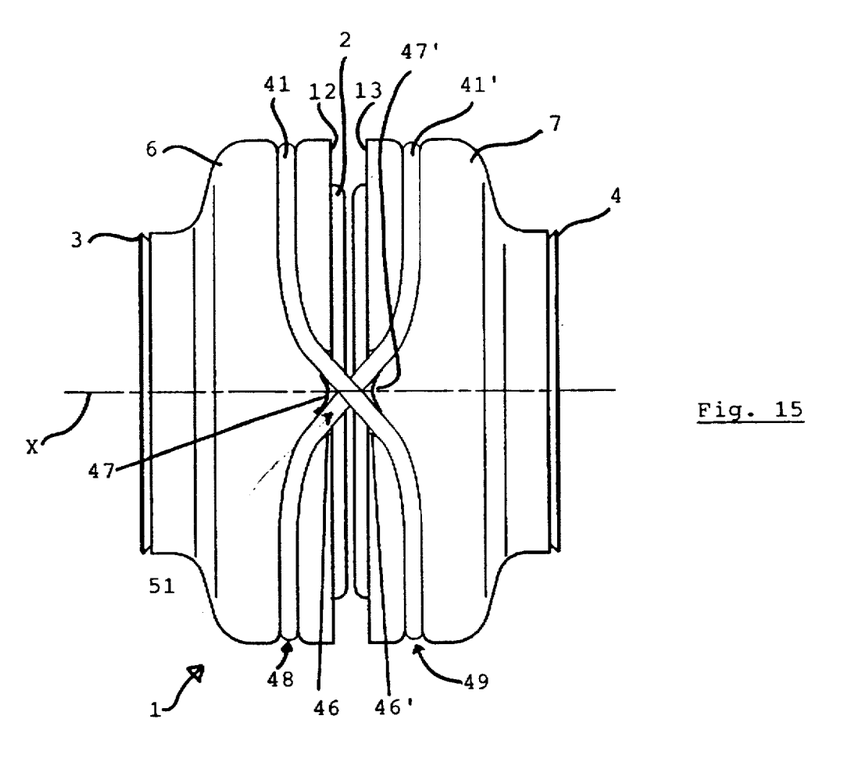
FIG. 15 A further embodiment of the device according to the invention with crossing, coaxially arranged elements.

FIGS. 13 to 15 show alternative solutions to the embodiment described hereinbefore, the same parts having the same reference numerals. Once again there are circular, damped, spring elastic elements 41 (also 41' in FIG. 15) formed from twisted or interlaced metal cable. In projection along the major axis X of the device 1, said elements also have a substantially circular contour. They are located in fastenings 48, 49 constructed as grooves for the same. In the construction of FIG. 13 the support parts 6, 7 in each case engage with projections 52, 53 in corresponding recesses 54, 55 of the corresponding facing element, axial and circumferential movement clearance or free spaces being left, so that the support parts can perform axial and angular movements relative to one another. The fastenings 48, 49 are so introduced into the projections 52, 53 that in the unloaded state the inserted element 41 is in a radial plane to the major axis X (FIG. 13a). In the case of axial loading (FIG. 13b), the element 41 assumes a meander shape. In facing, i.e. axially parallel marginal areas 56, 57 of the projections 52, 53, the fastenings once again have expansions 47, 47', which in the case of relative movement of the support parts 6, 7 lead to a progressive change of the forcepath characteristic through the action of their walls on the element 41.

In the construction of FIG. 14 once again the support parts 6, 7 face one another with front faces 12, 13 located in radial planes (to the axis X). The fastenings 48, 49 are formed by curved grooves constructed in the support parts 6, 7 and which issue into the front faces 12, 13 that the openings of the fastenings 48, 49 face one another in an aligned manner. In the vicinity of the front faces 12, 13 the fastenings 48, 49 have expansions 47, 47' used for progressively increasing the force-path characteristic, as described hereinbefore. The element 41 is coaxial to the major axis X, but is guided by the fastenings 48, 49 in meander-like manner between the support parts 6, 7. The grooves are covered by ring plates 17'. Radial sectional representations in the groove areas furthest removed from the front faces or areas of the openings of the grooves in the front faces 12, 13 correspond to those of FIGS. 4 and 5.

In the construction of FIG. 15 the grooves extend over the circumference of the support parts 6, 7. At 51 and on the side diagonally facing the axis X there are crossing points of the elements 41, 41', in which the grooves are guided under an acute angle of approximately 45° to the facing front faces 12, 13 of the support parts. Whereas the grooves 48, 49 over most of the circumference have a width corresponding to that of the elements 41, 41', so that they are closely engaged in the grooves 48, 49, here again the grooves 48 49 are widened or expanded by the portions 46, 46'or 47, 47', so that here there is also a limited free movement area for the elements 41, 41' in the case of mutual relative movements of the support parts 6, 7, until the elements 41, 41' engage on one of the side walls in the vicinity of the expansions 46, 46', 47, 47' and therefore there is a progressive rise in the force-path characteristic with relative movements of the supports parts 6, 7.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A device for a movable connection of pipe ends in an exhaust system, comprising:

a flexible pipe element having first and second connection ends; and at least one damped-spring elastic element acting between the first and second connection ends being held in support parts respectively connected to the first and second connection ends, the support parts having fastenings with expanded portions containing the at least one damped-spring elastic element, and when relative motion occurs between the support parts, the support parts progressively limiting increased displacements caused by relative motion between the support parts to modify a linear spring characteristic of the at least one damped-spring elastic element.

2. A device according to claim 1, wherein:

said at least one damped-spring elastic element has a circular contour at least in projection and said support parts extend perpendicular to a circumferential extension of said at least one damped-spring elastic element.

3. A device according to claim 1, wherein:

said support parts have one of widening channels or grooves in which said at least one damped-spring elastic element is embedded.

4. A device according to claim 1, wherein:

said support parts are expandable on all sides of said at least one damped-spring elastic element.

5. A device according to claim 1, wherein:

said support parts are expandable towards front faces of said support parts.

6. A device according to claim 1, wherein:

said at least one damped-spring elastic element is circular.

7. A device according to claim 1, wherein:

said at least one damped-spring elastic element has a helix and said support parts are expandable in a direction of a circumference of the helix.

8. A device according to claim 1, wherein:

said at least one damped-spring elastic element is guided in a helical-like manner.

9. A device according to claim 5, wherein:

said at least one damped-spring elastic element conforms to an area of said support parts constructed coaxially to a part of the flexible pipe element.

10. A device according to claim 1, wherein:

a symmetry axis of said at least one damped-spring elastic element extends radially to a major axis of the flexible pipe element.

11. A device according to claim 1, wherein:

a symmetry axis of said at least one damped-spring elastic element extends parallel to a major axis of the flexible pipe element.

12. A device according to claim 1, wherein:

a symmetry axis of said at least one damped-spring elastic element extends tangentially to a major axis of the flexible pipe element.

13. A device according to claim 1, wherein:

a symmetry axis of said at least one damped-spring elastic element is inclined under a finite angle unequal to 90° to the major axis of a path of the flexible pipe element to provide radial and parallel extension components to a major axis of the flexible pipe element.

14. A device according to claim 1, wherein:

said at least one damped-spring elastic element comprises interlaced metal wires.

15. A device according to claim 1, wherein:

said at least one damped-spring elastic element comprises stranded individual wires.

16. A device according to claim 1, wherein:

said at least one damped-spring elastic element is formed as rolls around a flat spring strip.

17. A device according to claim 1, wherein:

said at least one damped-spring elastic element is formed from a round spring wire.

18. A device for a moveable connection of pipe ends in an exhaust system, comprising:

a flexible pipe element having first and second connection ends; and at least one damped-spring elastic element acting between the first and second connection ends, the at least one damped-spring elastic element being held in support parts respectively connected to the first and second connection ends, the support parts containing the at least one damped-spring elastic element, and when relative motion occurs between the support parts, the support parts progressively limiting increased displacements caused by relative motion between the support parts to modify a linear spring characteristic of the at least one damped-spring elastic element.

* * * * *